(12) United States Patent
Imamura (10) Patent No.: US 10,546,188 B2
(45) Date of Patent: Jan. 28, 2020

(54) INFORMATION PROCESSING DEVICE CAPABLE OF DISTINGUISHING MOVE TYPES

(71) Applicant: CASIO COMPUTER CO., LTD., Shibuya-ku, Tokyo (JP)

(72) Inventor: Keiichi Imamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 9 days.

(21) Appl. No.: 15/794,749

(22) Filed: Oct. 26, 2017

(65) Prior Publication Data

US 2018/0181800 A1    Jun. 28, 2018

(30) Foreign Application Priority Data

Dec. 22, 2016   (JP) .................................. 2016-249099

(51) Int. Cl.
*G06K 9/00* (2006.01)
*G06T 7/73* (2017.01)
*G06T 11/60* (2006.01)

(52) U.S. Cl.
CPC ..... *G06K 9/00342* (2013.01); *G06K 9/00369* (2013.01); *G06T 7/74* (2017.01); *G06T 11/60* (2013.01); *G06T 2207/30196* (2013.01)

(58) Field of Classification Search
CPC ............ G01R 33/5608; G01R 33/3607; G01R 33/3621; G06T 11/003; G06T 2207/10088; G06T 7/74; G06T 2207/30196; G06T 11/60; G06K 9/00342; G06K 9/00369; G09B 29/007
See application file for complete search history.

(56) References Cited

U.S. PATENT DOCUMENTS

| 2013/0262359 | A1* | 10/2013 | Sambongi | ................ G06N 5/02 706/46 |
| 2014/0058812 | A1* | 2/2014 | Bender | .............. G06Q 30/0209 705/14.12 |
| 2017/0034288 | A1* | 2/2017 | Nakadaira | ................ H04L 67/18 |
| 2018/0181081 | A1* | 6/2018 | Imamura | .............. G04G 99/006 |

FOREIGN PATENT DOCUMENTS

| JP | 5734484 A | 2/1982 |
| JP | 06086023 U | 12/1994 |
| JP | H0916074 A | 1/1997 |

(Continued)

OTHER PUBLICATIONS

Extended European Search Report (EESR) dated Mar. 1, 2018 issued in counterpart European Application No. 17198837.1.

(Continued)

*Primary Examiner* — John W Lee
(74) *Attorney, Agent, or Firm* — Holtz, Holtz & Volek PC (57) ABSTRACT

A portable terminal 1 includes an information acquisition unit 55, an output control unit 56 and an output unit 20. The information acquisition unit 55 acquires move locus information on a move due to daily behavior of a user and a move due to non-daily behavior. The output control unit 56 controls an output unit 20 such that the output unit 20 outputs the acquired move locus information in a state where it is possible to distinguish the move due to non-daily behavior of the user.

12 Claims, 5 Drawing Sheets

(56) References Cited

FOREIGN PATENT DOCUMENTS

| | | |
|---|---|---|
| JP | H1183531 A | 3/1999 |
| JP | 2002358162 A | 12/2002 |
| JP | 2004286496 A | 10/2004 |
| JP | 2004297356 A | 10/2004 |
| JP | 2005106483 A | 4/2005 |
| JP | 2005331294 A | 12/2005 |
| JP | 2011117943 A | 6/2011 |
| JP | 2012189531 A | 10/2012 |
| JP | 2013130918 A | 7/2013 |
| JP | 2014157076 A | 8/2014 |

OTHER PUBLICATIONS

Related U.S. Appl. No. 15/856,071; Title: "Timepiece, Method of Display Control, and Storage Medium"; First Named Inventor: Keiichi Imamura: filed Dec. 28, 2017.

Japanese Office Action (and English language translation thereof) dated Oct. 23, 2018 issued in Japanese Application No. 2016-249099.

\* cited by examiner

| ACTIVITY \ GPS MODE | ACCURACY PRIORITY | BATTERY PRIORITY |
|---|---|---|
| CLIMBING/TREKKING | ONE POSITIONING/5 SECONDS | ONE POSITIONING/60 SECONDS |
| FISHING | ONE POSITIONING/5 SECONDS | ONE POSITIONING/60 SECONDS |
| CYCLING | ONE POSITIONING/1 SECOND | ONE POSITIONING/5 SECONDS |
| SURFING | ONE POSITIONING/1 SECOND | ONE POSITIONING/5 SECONDS |
| SKIING/SNOWBOARDING | ONE POSITIONING/1 SECOND | ONE POSITIONING/5 SECONDS |
| DAILY BEHAVIOR | ONE POSITIONING/1 TO 6 MINUTES | |

INFORMATION PROCESSING DEVICE CAPABLE OF DISTINGUISHING MOVE TYPES

CROSS-REFERENCE TO RELATED APPLICATIONS

This application is based on and claims the benefit of priority from Japanese Patent Application No. 2016-249099, filed on 22 Dec. 2016, the content of which is incorporated herein by reference.

BACKGROUND OF THE INVENTION

Field of the Invention

The present invention relates to an information processing device capable of distinguishing move types.

Related Art

Conventionally, a technology is known in which a user's behavior is sensed, and in which a move locus is acquired from the results of the sensing. In this type of technology, for example, as disclosed in Japanese Utility Model Application Publication No. 6-86023, there is a technology in which the move locus information of the user is displayed so as to be superimposed on a map.

SUMMARY OF THE INVENTION

An information processing device according to one aspect of the present invention comprising: a processor; and a storage unit which stores a program that is performed by the processor, wherein the processor uses the program stored in the storage unit so as to perform: a move locus information acquisition processing for acquiring move locus information on a move due to daily behavior of a user and a move due to non-daily behavior; and an output processing for outputting the move locus information acquired by the move locus information acquisition processing in a state where it is possible to distinguish the move due to non-daily behavior of the user. An information processing device according to one aspect of the present invention comprising: a processor; and a storage unit which stores a program that is performed by the processor, wherein the processor uses the program stored in the storage unit so as to perform: a move locus information acquisition processing for acquiring move locus information on a move due to daily behavior of a user and a move due to non-daily behavior; and a display processing for displaying the move locus information so as to superimpose the move locus information on a corresponding map in a state where it is possible to distinguish the move due to non-daily behavior of the user. A move locus information output method according to one aspect of the present invention which is performed by an information processing device, the move locus information. output method comprising: a move locus information acquisition processing for acquiring move locus information on a move due to daily behavior of a user and a move due to non-daily behavior; and an output processing for outputting the move locus information acquired in the move locus information acquisition step in a state where it is possible to distinguish the move due to non-daily behavior of the user. A non-transitory storage medium according to one aspect of the present invention encoded with a computer-readable program that controls a processor to execute: a move locus information acquisition processing for acquiring move locus information on a move due to daily behavior of a user and a move due to non-daily behavior; and an output processing for outputting the move locus information acquired by the move locus information acquisition processing in a state where it is possible to distinguish the move due to non-daily behavior of the user.

DETAILED DESCRIPTION OF THE INVENTION

Embodiments of the present invention will be described below by referring to the drawings.

Figure 1:
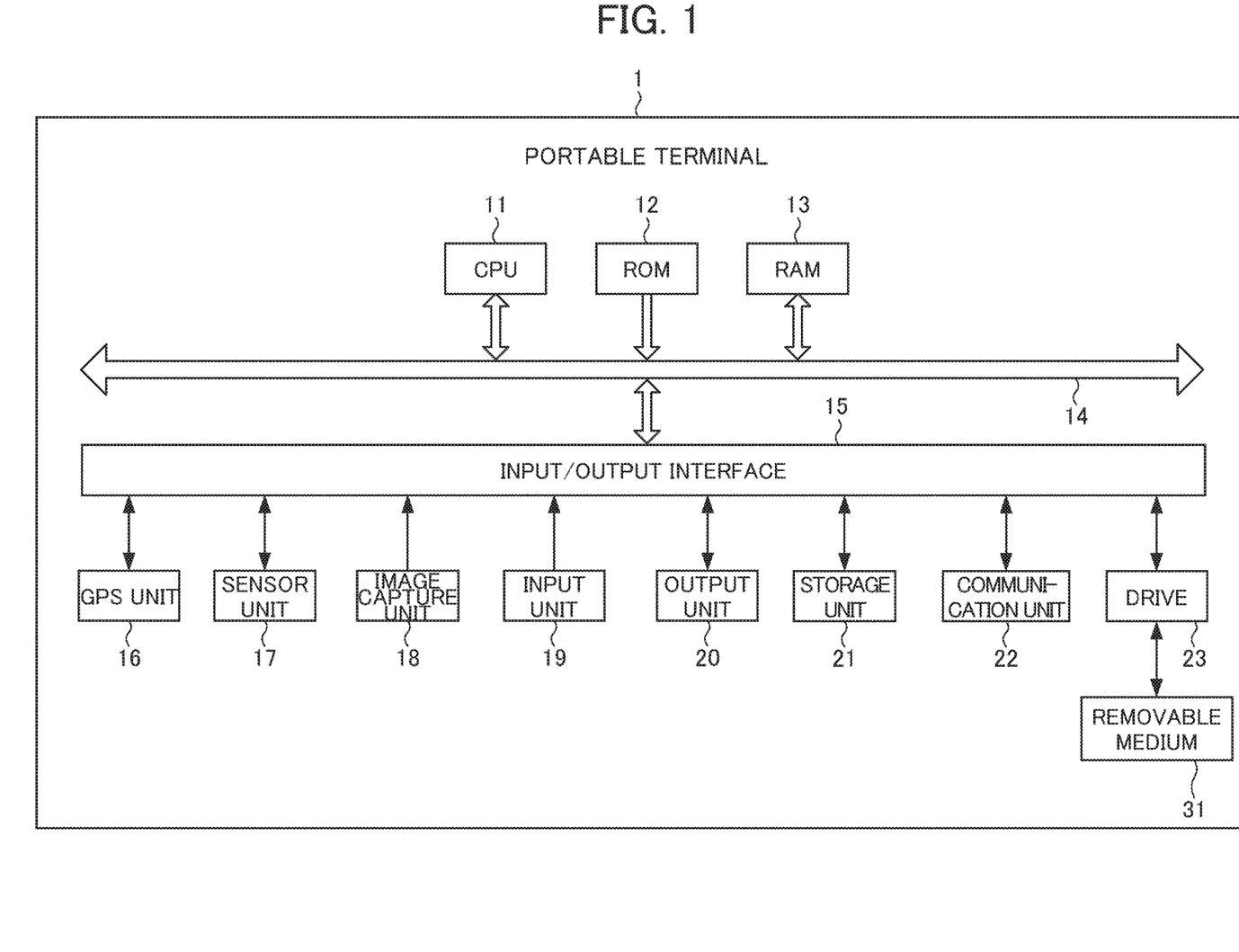
FIG. 1 is a block diagram showing the hardware configuration of a portable terminal 1 according to an embodiment of an information processing device of the present invention.

FIG. 1 is a block diagram showing the hardware configuration of a portable terminal 1 according to an embodiment of the present invention. The portable terminal 1 is configured as a smartphone, for example.

The portable terminal 1 includes a central processing unit (CPU) 11, a read only memory (ROM) 12, a random access memory (RAM) 13, a bus 14, an input-output interface 15, a global positioning system (GPS) unit 16, a sensor unit 17, an image capture unit 18, an input unit 19, an output unit 20, a storage unit 21, a communication unit 22, and a drive 23.

The CPU 11 executes various types of processing according to a program stored in the ROM 12 or a program loaded from the storage unit 21 into the RAM 13.

Data, etc. required upon the CPU 11 executing the various processing is stored in the RAN 13 as appropriate.

The CPU 11, ROM 12 and RAM 13 are connected to each other via the bus 14. In addition, the input/output interface 15 is also connected to this bus 14. The input-output interface 15 is further connected to the GPS unit 16, the sensor unit 17, the image capture unit 18, the input unit 19, the output unit 20, the storage unit 21, the communication unit 22, and the drive 23.

The GPS unit 16 includes an antenna. The GPS unit 16 receives GPS signals transmitted from a plurality of GPS satellites to acquire position information about the portable terminal 1.

The sensor unit 17 is configured such that the sensor unit 17 can measure the moves of the portable terminal 1 in the X, Y and Z axes directions and the vibrations of the portable terminal 1. The sensor unit 17 is formed with various types of sensors such as an acceleration sensor, a gyro sensor, a geomagnetic sensor and an atmospheric pressure sensor. In other words, the portable terminal 1 is configured such that, based on the results of sensing from the sensor unit 17, it is possible to determine its own condition and perform positioning by autonomous navigation. In the following description, positioning using GPS information output from the GPS unit 16 is referred to as "GPS positioning", positioning by autonomous navigation using the sensor information of the portable terminal acquired from the sensor unit 17 formed with various types of sensors such as the acceleration sensor and the geomagnetic sensor is referred to as "autonomous navigation positioning" and positioning obtained by combining these positioning methods is referred to as "hybrid positioning".

The image capture unit 18 includes an optical lens unit and an image sensor, which are not shown.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The image capture unit 18 also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE. The AFE executes a variety of signal processing such as A/D (Analog/Digital) conversion processing of the analog signal. The variety of signal processing generates a digital signal that is output as an output signal from the image capture unit 18. The output signal of the image capture unit 18 is output as data on a captured image, and is supplied as necessary to the CPU 11, an unillustrated image processing unit and the like.

The input unit 19 is configured by various buttons and the like, and inputs a variety of information in accordance with instruction operations by the user. The output unit 20 is configured by the display unit, a speaker, and the like, and outputs images and sound. The storage unit 21 is configured by DRAM (Dynamic Random Access Memory) or the like, and stores data of various images. The communication unit 22 controls communication with a different apparatus (not shown in the drawings) via a network including the Internet.

A removable medium 31 composed of a magnetic disk, an optical disk, a magneto-optical disk, semiconductor memory or the like is installed in the drive 23, as appropriate. Programs that are read via the drive 23 from the removable medium 31 are installed in the storage unit 21, as necessary. Similarly to the storage unit 19, the removable medium 31 can also store a variety of data such as the image data stored in the storage unit 21.

The portable terminal 1 configured as described above has the function of changing a display aspect according to whether a move of the user is a move due to daily behavior of the user or a move due to non-daily behavior and thereby displaying a move locus on a map. In the present embodiment, non-daily behavior includes, for example, exercise activities such as climbing, trekking, fishing, cycling, surfing, skiing and snowboarding. In the following description, daily behavior and exercise activity are collectively referred to as an activity. In other words, in the portable terminal 1, the display of the move locus formed with position information acquired at the time of the behavior of the user differs according to whether the move locus is a move due to daily behavior of the user or a move due to non-daily behavior when the user performs an exercise activity.

Figure 2:
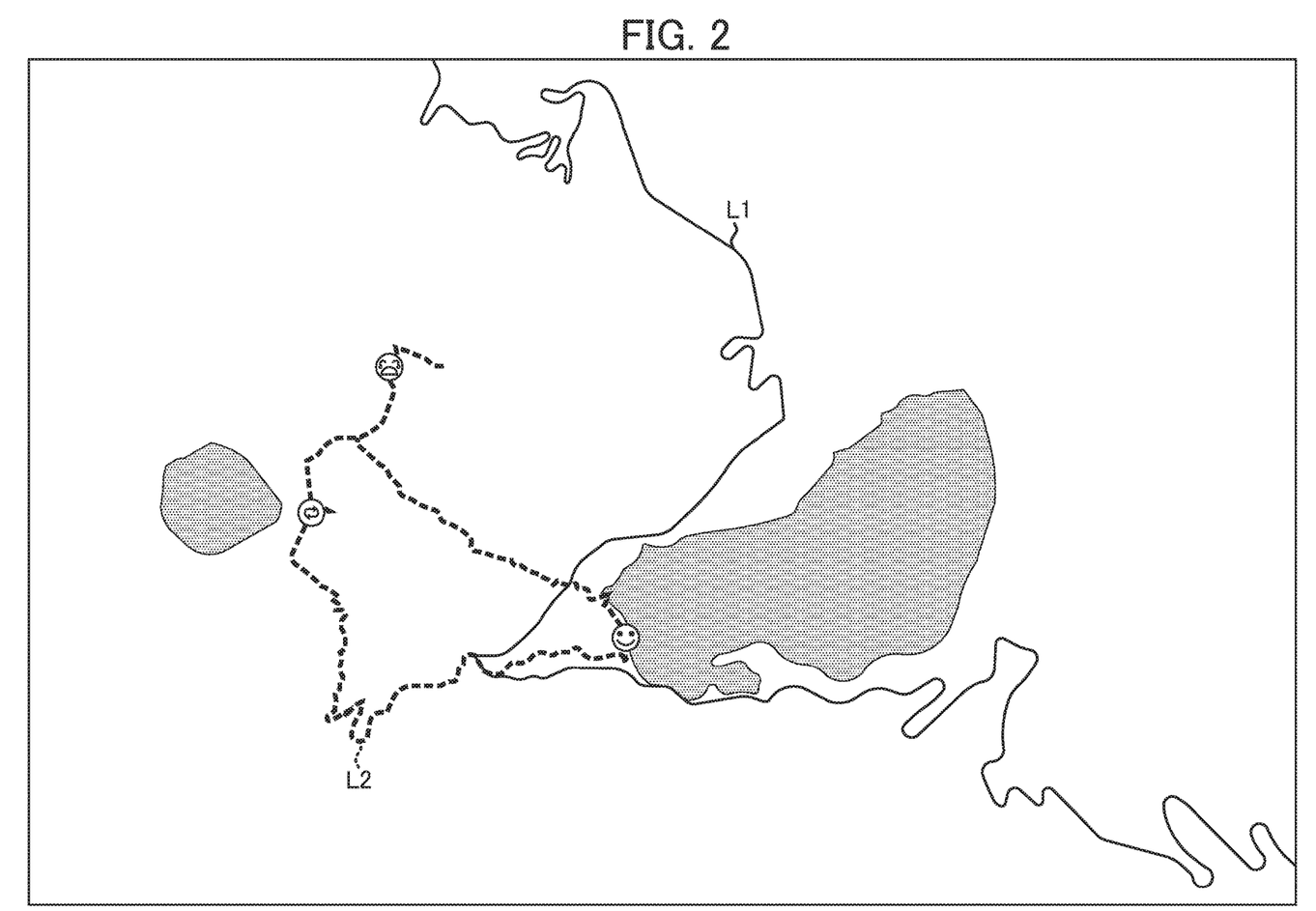
FIG. 2 is a schematic view showing an example of a map display of move loci in the present embodiment.

FIG. 2 is a schematic view showing a display example of the move loci in the map display of the present embodiment. In the portable terminal 1 of the present embodiment, as shown in FIG. 2, move loci L1 and L2 are displayed on the map. The move locus L1 displayed is a move locus due to daily behavior of the user, and the move locus L2 is a move locus due to non-daily behavior of the user. In other words, the move locus L1 of a solid line represents the daily behavior of the user, and is, for example, a move locus in which the user moves by car from the user's home to a place where trekking is performed, in which the user performs a trekking activity and in which, after the trekking the user moves again by car to another place. The move locus L2 of a broken line represents non-daily behavior of the user, and is, for example, a move locus in which the user moves when performing a trekking activity. The display of the move locus may be made to differ depending on whether the move locus due to daily behavior or non-daily behavior, and furthermore, the display of the move locus may be made to differ depending on each exercise activity even in non-daily behavior. Moreover, for example, the display of the type of line or the color may be made to differ or may be made close according to the moving speed of the move locus.

When the user moves around the same course a plurality of times due to an exercise activity, a plurality of move loci are not displayed, and the number of times the user moves therearound is displayed in the vicinity of the move locus. When the user moves around the same course or courses overlap each other, for example, the most recent move locus may be darkened in color or may be displayed in the front.

When the move loci of the same activity overlap each other, for example, the activity having a low frequency of appearance may be preferentially displayed or the most recent activity may be preferentially displayed. The same/different activities may be displayed so as to be lit. The move locus of the exercise activity is evaluated, and thus for example, an excellent move locus such as an actual/practice move locus or the fastest move locus may be actively displayed.

When the display aspect of the exercise activity is a color, different colors may be used such that green is used for climbing or trekking so as to evoke mountains and trees, blue is used for surfing or fishing so as to evoke water, gray is used for cycling so as to evoke a road surface and white is used for skiing or snowboarding so as to evoke snow. Lines forming the move locus may be moved so as to blink sequentially in the order of moves.

Figure 3:
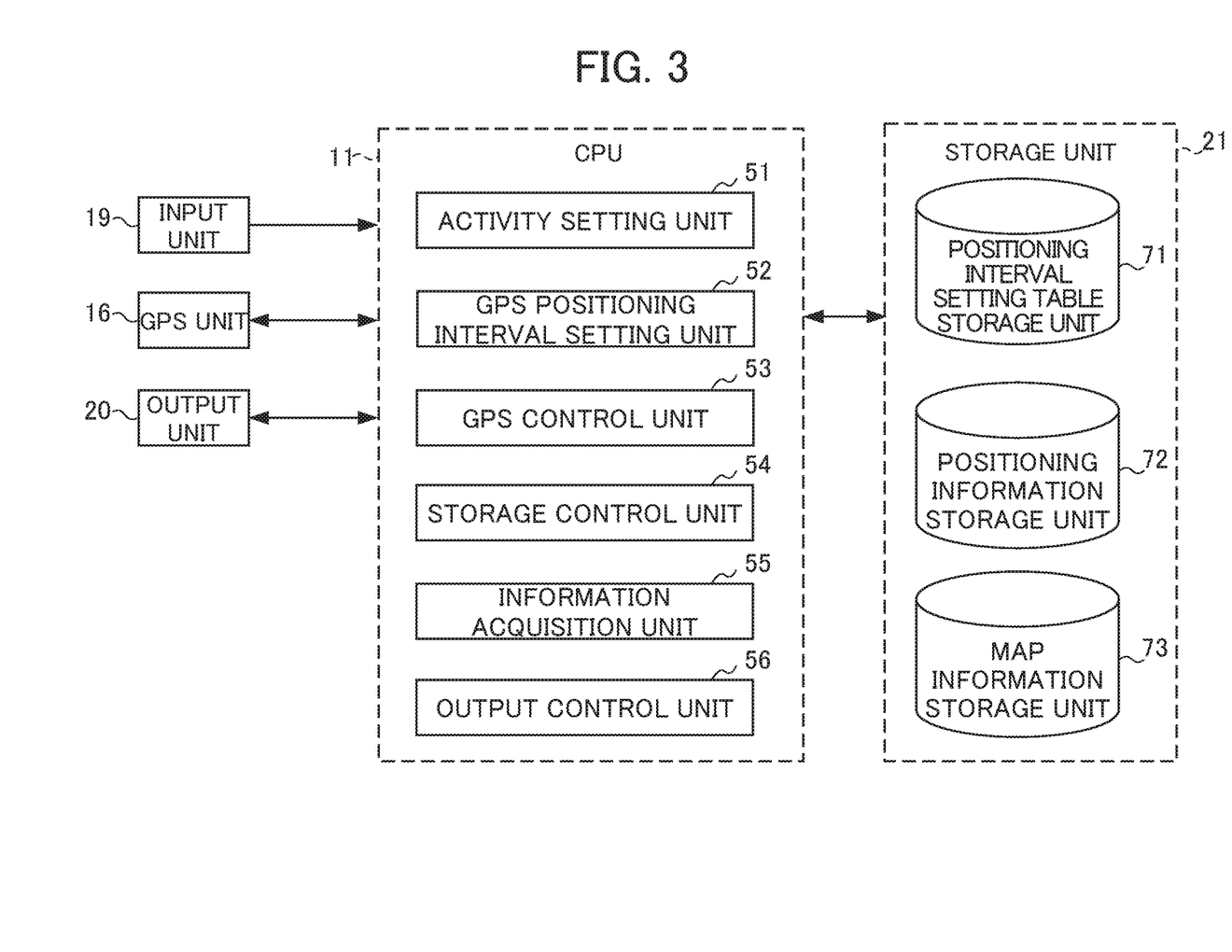
FIG. 3 is a functional block diagram showing, in the functional configuration of the portable terminal 1 of FIG. 1, a functional configuration for performing position information storage processing and move locus information display processing.

FIG. 3 is a functional block diagram showing, in the functional configuration of the portable terminal 1 of FIG. 1, a functional configuration for performing position information storage processing and move locus information display processing. The position information storage processing refers to a series of processing steps in which GPS positioning is performed and in which position information output together with activity information at the time of the positioning is stored. The move locus information display processing refers to a series of processing steps in which the move locus is displayed on the map and in which the display of the move locus is changed for each activity.

When the position information storage processing is performed, as shown in FIG. 3, in the CPU 11, an activity setting unit 51, a GPS positioning interval setting unit 52, a GPS control unit 53 and a storage control unit 54 function.

In one region of the storage unit 21, a positioning interval setting table storage unit 71 and a positioning information storage unit 72 are set.

Figure 4:
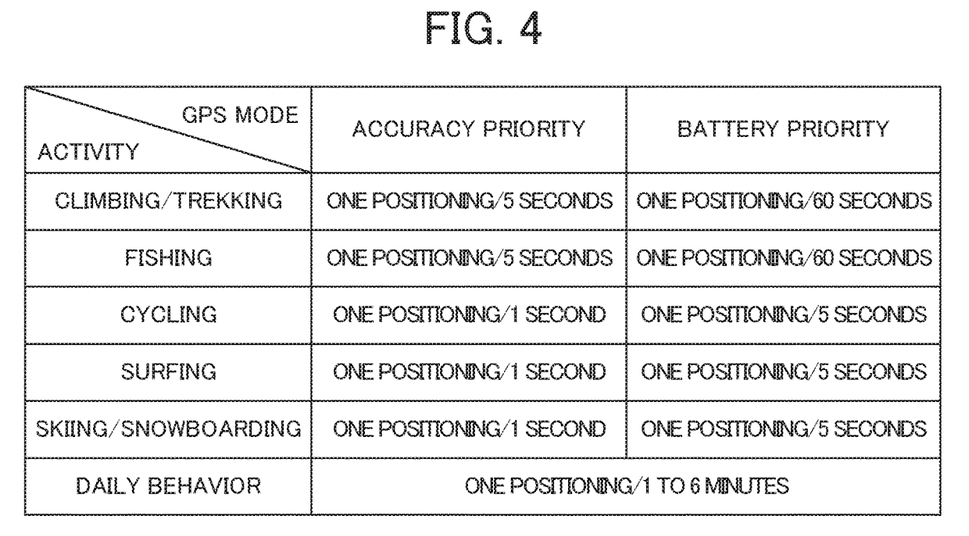
FIG. 4 is a schematic view showing a positioning interval setting table in the present embodiment.

In the positioning interval setting table storage unit 71, data on a positioning interval setting table is stored. FIG. 4 is a schematic view showing the positioning interval setting table in the present embodiment. In the present embodiment, activities are classified into exercise activities of [climbing/trekking], [fishing], [cycling], [surfing] and [skiing/snowboarding], which are non-daily behaviors, and [daily behavior]. In the positioning interval setting table, as shown in FIG. 4, positioning intervals corresponding to the activities are set. The positioning interval differs depending on whether [accuracy priority] or [battery priority] is adopted according to a GPS mode setting. Specifically, in the case of the activity [climbing/trekking], [one positioning/5 seconds] is used for [accuracy priority], and [one positioning/60 seconds] is used for [battery priority]. On the other hand, in the case of [daily behavior] other than [climbing/trekking] to [skiing/snowboarding], regardless of [accuracy priority] and [battery priority], [one positioning/1 to 6 minutes] is used. In other words, the positioning interval differs significantly between exercise activities and daily behavior. Although the positioning interval differs significantly between daily behavior and exercise activities, the positioning interval may be made to differ finely according to the details of the exercise activity (the moving speed in the behavior).

In the positioning information storage unit 72, the position information obtained by performing GPS positioning with the GPS unit 16 and the activity information set when the position information is acquired are stored. The activity information in the present embodiment is divided into daily behavior and non-daily behavior, and in non-daily behavior, for example, the activity information is further divided into various types of exercise activities of climbing, trekking, fishing, cycling, surfing, skiing and snowboarding.

The activity setting unit 51 sets activities through the input unit 19 by an activity setting operation of the user. The activity setting operation includes, for example, an operation for directly setting an activity and an operation for starting up an application related to the activity.

The GPS positioning interval setting unit 52 sets the positioning interval corresponding to the set activity with reference to the positioning interval setting table stored in the positioning interval setting table storage unit 71. For example, when the activity [climbing/trekking] is set, the positioning interval is set to [one positioning/5 seconds] for [accuracy priority].

The GPS control unit 53 controls the GPS unit 16 so as to perform positioning based on the positioning interval corresponding to the set activity.

The storage control unit 54 stores together, in the positioning information storage unit 72, the position information output from the GPS unit 16 and the activity information at the time of the positioning.

When the move locus information display processing is performed, as shown in FIG. 3, in the CPU 11, an information acquisition unit 55 and an output control unit 56 function. In one region of the storage unit 21, a map information storage unit 73 is further set. In the map information storage unit map information is stored.

The information acquisition unit 55 acquires the activity information corresponding to the position information from the positioning information storage unit 72, and acquires, from the map information storage unit 73, the map information corresponding to the acquired position information.

The output control unit 56 controls the output unit 20 so as to output an image and the like. Specifically, the output control unit 56 controls the output unit 20 so as to display a map in a range corresponding to the position information. The output control unit 56 controls the output unit 20 so as to display, in a corresponding place on the map, the move locus whose display aspect is changed according to the activity. Consequently, in the output unit 20, the map is displayed which is as shown in FIG. 2 and in which the display aspect of the move locus differs depending on the activity.

Figure 5:
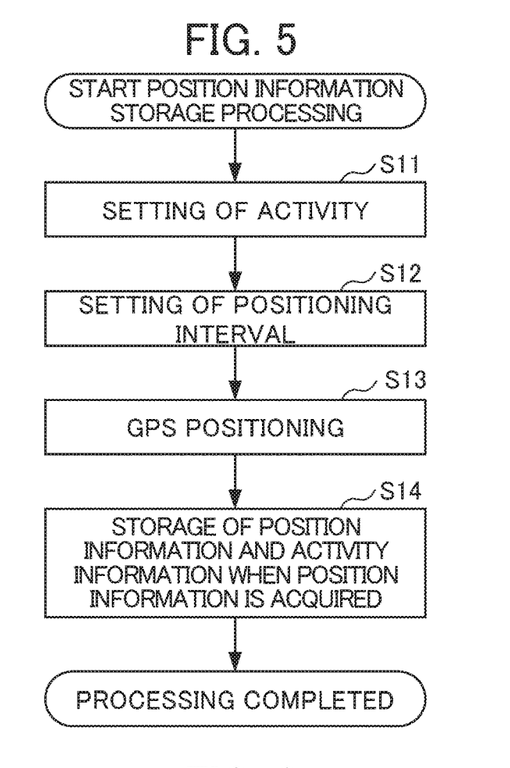
FIG. 5 is a flowchart illustrating the flow of the position information storage processing which is performed by the portable terminal 1 of FIG. 1 having the functional configuration of FIG. 3.

FIG. 5 is a flowchart illustrating the flow of the position information storage processing which is performed by the portable terminal 1 of FIG. 1 having the functional configuration of FIG. 3. The position information storage processing is started by an operation for starting the position information storage processing performed by the user on the input unit 19.

In step S11, the activity setting unit 51 sets the activity through the input unit 19 by the activity setting operation of the user. The user sets the activity among climbing, trekking, fishing, cycling, surfing, skiing and snowboarding. When the setting of the activity is not performed arbitrarily by the user, daily behavior is set as a default setting.

In step S12, the GPS positioning interval setting unit 52 sets the positioning interval corresponding to the set activity with reference to the positioning interval setting table stored in the positioning interval setting table storage unit 71.

In step S13, the GPS control unit 53 controls the GPS unit 16 so as to perform positioning based on the positioning interval corresponding to the set activity. The position information obtained by performing positioning at a predetermined interval is output from the GPS unit 16.

In step S14, the storage control unit 54 stores, in the positioning information storage unit 72, the position information output from the GPS unit 16 together with the activity information at the time of the positioning. Thereafter, the position information storage processing is completed.

Figure 6:
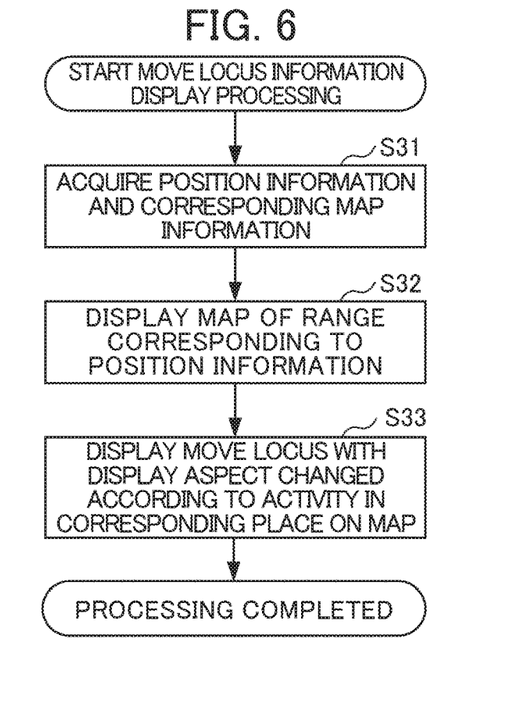
FIG. 6 is a flowchart illustrating the flow of the move locus information display processing which is performed by the portable terminal 1 of FIG. 1 having the functional configuration of FIG. 3.

FIG. 6 is a flowchart illustrating the flow of the move locus information display processing which is performed by the portable terminal 1 of FIG. 1 having the functional configuration of FIG. 3. The move locus information display processing is started by an operation for starting the move locus information display processing performed by the user on the input unit 19.

In step S31, the activity information corresponding to the position information is acquired from the positioning information storage unit 72, and the map information corresponding to the acquired position information is acquired from the map information storage unit 73.

In step S32, the output control unit 56 controls, based on the acquired map information, the output unit 20 so as to display a map in a range corresponding to the position information.

In step S33, the output control unit 56 controls, based on the position information and the activity information, the output unit 20 so as to display, in a corresponding place on the map, the move locus whose display aspect is changed according to the activity. In the present embodiment, the display aspect is performed by changing the type of line. As long as the difference of the activities can be perceived, for example, the display aspect may be changed such as by changing the colors or the width of the lines. Thereafter, the start of the move locus information display processing is completed.

The portable terminal 1 configured as described above includes the information acquisition unit 55, the output control unit 56 and the output unit 20. The information acquisition unit 55 acquires the move locus information of the user. The output control unit 56 controls the output unit 20 so as to output the acquired move locus information in a state where it is possible to distinguish whether the move of the user is a move due to daily behavior of the user or a move due to non-daily behavior. In this way, in the portable terminal 1, the move locus information can be output in a state where it is possible to distinguish whether the move of the user is a move due to daily behavior of the user or a move due to non-daily behavior.

The output control unit 56 controls the output unit 20 so as to superimpose and display the move locus information on the corresponding map and to display the move locus information in a state where it is possible to distinguish whether the move of the user is a move due to daily behavior of the user or a move due to non-daily behavior. In this way, in the portable terminal 1, the move locus information can be displayed in a state where it is possible to distinguish whether the move of the user is a move due to daily behavior of the user or a move due to non-daily behavior.

The output control unit 56 outputs the move locus information to the outside of the portable terminal 1 through the communication unit 22 or the like. In this way, in the portable terminal 1, the move locus information can be output to the outside in a state where it is possible to distinguish whether the move of the user is a move due to daily behavior of the user or a move due to non-daily behavior.

The portable terminal 1 includes the storage unit 21 which stores the move locus information output by the output unit 20. In this way, in the portable terminal 1, the move locus information can be stored.

The portable terminal 1 also includes the activity setting unit 51. When the move of the user is a move due to non-daily behavior, the activity setting unit 51 sets, before the move of the user, behavior information indicating that the move of the user is a move due to non-daily behavior. An output means records, based on the behavior information set by the activity setting unit 51, the move locus information in a state where it is possible to distinguish whether the move of the user is a move due to daily behavior of the user or a move due to non-daily behavior. In this way, in the portable terminal 1, the move locus information can be recorded in a state where it is possible to distinguish whether the move of the user is a move due to daily behavior of the user or a move due to non-daily behavior.

The GPS unit 16 which acquires the position information is included. The GPS control unit 53 performs control so as to acquire the move locus information with the acquired position information by starting up the GPS unit 16 at a predetermined time interval. In this way, in the portable terminal 1, the move locus information can be acquired with the acquired position information by starting up the GPS unit 16 at the predetermined time interval.

The GPS control unit 53 makes the time interval at which the GPS unit 16 is started up differ depending on whether the move of the user is a move due to daily behavior of the user or a move due to non-daily behavior. In this way, in the portable terminal 1, the interval at which the position information is acquired can be made to differ depending on whether the move of the user is a move due to daily behavior of the user or a move due to non-daily behavior.

The GPS control unit 53 changes the time interval at which the GPS unit 16 is started up when the move of the user is a move due to non-daily behavior to a time interval shorter than the time interval at which the GPS unit 16 is started up when the move of the user is a move due to daily behavior. In this way, in the portable terminal 1, the position information can be acquired at a long interval for daily behavior whereas the position information can be acquired at a short interval for non-daily behavior.

Non-daily behavior includes a plurality of behaviors whose speeds differ from each other. The GPS control unit 53 makes the time interval at which the GPS unit 16 is started up when the move of the user is a move due to non-daily behavior differ based on the speed of the behavior. In this way, in the portable terminal 1, the position information can be acquired at a different interval for each non-daily behavior.

The GPS control unit 53 changes the time interval at which the GPS unit 16 is started up when the move of the user is a move due to non-daily behavior to a short time interval for a move whose behavior speed is fast as compared with a move whose behavior speed is slow. In this way, in the portable terminal 1, in non-daily behavior, the time interval can be changed according to the speed of the move.

The output control unit 56 acquires the move locus information in which it is possible to distinguish whether the move of the user is a move due to daily behavior of the user or a move due to non-daily behavior. The output unit 20 superimposes and displays the move locus information on the corresponding map, and displays the move locus information in a state where it is possible to distinguish whether the move of the user is a move due to daily behavior of the user or a move due to non-daily behavior. In this way, in the portable terminal 1, the move locus information can be displayed in a state where it is possible to distinguish whether the move of the user is a move due to daily behavior of the user or a move due to non-daily behavior.

Non-daily behavior is at least one of running, climbing, trekking, cycling, sailing, fishing, surfing, skiing and snowboarding. In this way, in the portable terminal 1, various exercise activities can be set as non-daily behavior.

The present invention is not limited to the embodiment described above, and variations, modifications and the like in a scope capable of achieving the object of the present invention are included in the present invention. Although in the embodiment described above, the display of the move locus formed with the position information acquired at the time of the behavior of the user is made to differ according to whether the move of the user is a move due to daily behavior of the user or a move due to non-daily behavior when the user performs an exercise activity, only the move due to non-daily behavior of the user may be displayed.

Although in the embodiment discussed above, the move locus formed with GPS positioning is described, as long as the move locus corresponds to the time of the activity, the move locus may be formed with autonomous navigation positioning, the move locus may be formed by another method or the move locus may be formed by a combination of GPS positioning and autonomous navigation positioning. When GPS positioning and autonomous navigation positioning are combined, for example, while GPS positioning is not being performed, the move locus is formed with autonomous navigation positioning. A move locus which is obtained by selecting predetermined positioning or a move locus which is formed as a result of the user arbitrarily tracing the locus or determining a start point and an end point may be adopted.

Although in the embodiment described above, the activity corresponding to the time at which the position information is recorded is recorded, a determination may be made from the positioning interval of the position information forming the move locus such that the type of activity is identified. For example, together with the acquisition of the position information, a behavior when the position information forming the move locus with the sensor information resulting from sensing or the like is acquired may be analyzed such that the type of activity is identified. Specifically, for example, based on the move of the user detected from the sensor information from the sensor unit 17, the portable terminal 1 determines with the CPU 11 whether or not the move of the user is a move due to daily behavior of the user. The output control unit 56 produces, based on the result of the determination, an output in a state where it is possible to distinguish whether the move of the user is a move due to daily behavior of the user or a move due to non-daily behavior.

Although in the embodiment described above, the position information storage processing is started by the operation for starting the position information storage processing performed by the user on the input unit 19, a configuration may be adopted in which while the portable terminal 1 is being started up, the position information storage processing due to daily behavior is constantly performed by a constantly installed application, and in which instead of the position information storage processing due to daily behavior, the position information storage processing due to non-daily behavior may be performed by an operation for providing an instruction to start the exercise activity by the user, for example, an operation for starting the position information storage processing in the exercise activity on the input unit 19 or the startup of an application related to the exercise activity.

Although in the embodiment described above, various types of processing such as the storage, display and external output of the position information or the move locus information are performed by the portable terminal 1, a device which performs the storage, display and external output of the position information or the move locus information and another device which inputs the move locus information output by the device and which displays the move locus information such that difference of activities is perceived may be used.

Although in the embodiment described above, as an example of the portable terminal 1 to which the present invention is applied, a smartphone is used, there is no particular limitation on this configuration. For example, the present invention can be applied to electronic devices in general which have the functions of position information storage processing and move locus information display processing. Specifically, for example, the present invention can be applied to a notebook type personal computer, a printer, a television set, a video camera, a digital camera, a portable navigation device, a mobile phone, a smart watch, a portable game device and the like.

The processing sequence described above can be executed by hardware, and can also be executed by software. In other words, the hardware configuration of FIG. 3 is merely an illustrative example, and the present invention is not particularly limited thereto. More specifically, the types of functional blocks employed to realize the above-described functions are not particularly limited to the examples shown in FIG. 3, so long as the portable terminal can be provided with the functions enabling the aforementioned processing sequence to be executed in its entirety. A single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded or a hard disk, etc. included in the storage unit 21 of FIG. 1.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An information processing device comprising:
a hardware processor;
a display; and
a position information acquisition unit which acquires position information at a predetermined time interval;
wherein the hardware processor is configured to:
acquire move locus information of a user including the user's move locus based on the position information acquired by the position information acquisition unit, wherein the user's move locus includes a first move locus which is one part of the user's move locus and a second move locus which is another part of the user's move locus, acquire activity information of the user which is stored in association with the first move locus, wherein the activity information includes a type of user activity corresponding to the first move locus with which it associated, and wherein the second move locus is not associated with the activity information; and control the display to display the first move locus and the second move locus in different display modes in which the first move locus and second move locus are displayed with different display aspects from each other, wherein the activity information includes at least one of a plurality of types of user activity, and wherein the plurality of types of user activity include a plurality of activities in which movement speeds differ from each other, wherein the hardware processor controls the position information acquisition unit to set a first time interval for acquiring the position information in a case in which the type of user activity included in the activity information is a first type, and to set a second time interval for acquiring the position information in a case in which the type of user activity included in the activity information is a second type, wherein the movement speed in the first type of user activity is faster than the movement speed in the second type of user activity, and wherein the first time interval is shorter than the second time interval.

2. The information processing device according to claim 1, wherein the hardware processor controls the display to display the first move locus and the second move locus on a map which corresponds to the move locus information.

3. The information processing device according to claim 1, wherein the hardware processor controls the display to display the first move locus and the second move locus in different colors.

4. The information processing device according to claim 1, wherein the hardware processor controls the display to display the first move locus and the second move locus in different line widths.

5. The information processing device according to claim 1, further comprising a storage, wherein the hardware processor controls the storage to store the move locus information and the activity information, and wherein the first move locus included in the move locus information is stored in association with the activity information.

6. The information processing device according to claim 1, wherein the hardware processor:

sets the activity information based on an input operation to the information processing device by the user, and associates the set activity information with the first move locus.

7. The information processing device according to claim 1, wherein the hardware processor:

controls a sensor to detect movement of the user;

determines the user's activity based on the detected movement of the user; and sets the activity information corresponding to the determined user's activity, and associates the set activity information with the first move locus.

8. The information processing device according to claim 1, wherein the hardware processor controls the position information acquisition unit to set different time intervals for acquiring the position information depending on whether movement of the user corresponds to the type of user activity included in the activity information or not.

9. The information processing device according to claim 8, wherein the hardware processor controls the position information acquisition unit to set a third time interval for acquiring the position information in a case in which the movement of the user does not correspond to the type of user activity included in the activity information, wherein the first time interval and the second time interval are shorter than the third time interval.

10. The information processing device according to claim 1, wherein the user activity is at least one of running, climbing, trekking, cycling, sailing, fishing, surfing, skiing and snowboarding.

11. A non-transitory storage medium encoded with a computer-readable program that controls a processor to execute:

a position information acquisition process for controlling a position information acquisition unit to acquire position information at a predetermined time interval;

a move locus information acquisition processing for acquiring (i) move locus information of a user including the user's move locus based on the position information acquired by the position information acquisition unit, wherein the user's move locus includes a first move locus which is one part of the user's move locus and a second move locus which is another part of the user's move locus, and (ii) activity information of the user which is stored in association with the first move locus, wherein the activity information includes a type of user activity corresponding to the first move locus with which it associated, and wherein the second move locus is not associated with the activity information; and an output processing for controlling a display to display the first move locus and the second move locus in different display modes in which the first move locus and second move locus are displayed with different display aspects from each other, wherein the activity information includes at least one of a plurality of types of user activity, and wherein the plurality of types of user activity include a plurality of activities in which movement speeds differ from each other, wherein, in the position information acquisition process, the position information acquisition unit is controlled to set a first time interval for acquiring the position information in a case in which the type of user activity included in the activity information is a first type, and to set a second time interval for acquiring the position information in a case in which the type of user activity included in the activity information is a second type, wherein the movement speed in the first type of user activity is faster than the movement speed in the second type of user activity, and wherein the first time interval is shorter than the second time interval.

12. The non-transitory storage medium according to claim 11, wherein the user activity is at least one of running, climbing, trekking, cycling, sailing, fishing, surfing, skiing and snowboarding.

* * * * *